United States Patent
Hofmann et al.

(10) Patent No.: US 8,075,725 B2
(45) Date of Patent: Dec. 13, 2011

(54) METHOD AND DEVICE FOR WELDING THERMOPLASTIC MATERIAL SHAPED PARTS, PARTICULARLY FOR CONTOUR-WELDING THREE-DIMENSIONAL SHAPED PARTS

(75) Inventors: Alexander Hofmann, Erlangen (DE); Stefan Hierl, Berg (DE)

(73) Assignee: Laserquipment AG, Erlangen (DE)

( * ) Notice: Subject to any disclaimer, the term of this patent is extended or adjusted under 35 U.S.C. 154(b) by 814 days.

(21) Appl. No.: 10/540,850

(22) PCT Filed: Dec. 4, 2003

(86) PCT No.: PCT/EP03/13668
§ 371 (c)(1), (2), (4) Date: Jun. 27, 2005

(87) PCT Pub. No.: WO2004/058485
PCT Pub. Date: Jul. 15, 2004

(65) Prior Publication Data
US 2006/0144509 A1    Jul. 6, 2006

(30) Foreign Application Priority Data
Dec. 27, 2002  (DE) .................... 102 61 642

(51) Int. Cl.
*B29C 65/16* (2006.01)
(52) U.S. Cl. .................................. 156/272.8
(58) Field of Classification Search ........... 156/272.2, 156/272.8, 304.1, 204.6, 379.6, 304.6, 379.63; 219/121.6, 121.63, 121.64
See application file for complete search history.

(56) References Cited

U.S. PATENT DOCUMENTS

| 5,893,959 | A | * | 4/1999 | Muellich ..................... 156/272.8 |
| 6,444,946 | B1 | * | 9/2002 | Korte ......................... 219/121.6 |
| 6,451,152 | B1 | * | 9/2002 | Holmes et al. ............. 156/272.8 |
| 2002/0100540 | A1 | * | 8/2002 | Savitski et al. ................ 156/157 |
| 2002/0104614 | A1 | * | 8/2002 | Beer et al. .................. 156/272.8 |
| 2003/0090562 | A1 | * | 5/2003 | Kubota et al. ................. 347/241 |
| 2003/0213552 | A1 | * | 11/2003 | Chen et al. ................. 156/272.8 |

FOREIGN PATENT DOCUMENTS

| DE | 33 04 717 A1 | 8/1984 |
| DE | 37 14 504 A1 | 11/1988 |
| DE | 38 33 110 A | 4/1990 |
| DE | 20001033 U1 * | 8/2000 |
| DE | 199 25 203 A1 | 12/2000 |
| EP | 0 890 865 B1 | 1/2002 |
| EP | 1405713 | * 4/2004 |
| FR | 2 597 379 A | 10/1987 |
| JP | 58163587 A * | 9/1983 |
| JP | 63212081 A * | 9/1988 |

OTHER PUBLICATIONS

Machine translation of the specifications of EP1405713, pp. 1-2.*
Translation of DE 20001033 U1, Feb. 26, 2010.*

* cited by examiner

*Primary Examiner* — Richard Crispino
*Assistant Examiner* — Daniel McNally
(74) *Attorney, Agent, or Firm* — Browdy and Neiamark, PLLC

(57) ABSTRACT

The invention relates to a method and an apparatus for welding thermoplastic molded articles wherein additional simultaneous irradiation, in the welding area (18), of one of the join partners (1) will lead to a temperature increase of this join partner, occasioning process-reliable welding.

7 Claims, 3 Drawing Sheets

Relative Elongation

METHOD AND DEVICE FOR WELDING THERMOPLASTIC MATERIAL SHAPED PARTS, PARTICULARLY FOR CONTOUR-WELDING THREE-DIMENSIONAL SHAPED PARTS

The invention relates to a method and an apparatus for welding and in particular contour-welding three-dimensional molded articles.

Lots of ways of prior art plastics laser beam welding have been developed. Fundamentally, the two join partners get in contact with each other in the vicinity of the contour that is to be welded. For a gap between the join partners to be avoided—which would negatively affect the welding result— and for any shape tolerances to be balanced, a clamping device acts on the join partners in the area of joining. Finally, they are being radiated in the area of welding by a laser welding beam, as a result of which at least one of the join partners will melt and the second partner will start melting by heat transfer, with both partners ultimately uniting integrally.

A typical example for that kind of welding is laser irradiation welding where the top join partner that the laser welding beam passes through is transmissive to the laser beam length respectively used and the bottom join partner is absorptive thereof.

Of the wide prior art range, DE 37 14 504 A1 is mentioned by way of example, describing a method of welding or cutting precious metals, but also plastics or biological tissues, which makes use of two co-ordinated laser beams of different wavelength. A first beam, for example of a wavelength of 193 nm, is directed towards the area of welding, with a second laser beam of greater wavelength being allocated. This increases the absorption of the first IR laser welding beam, improved welding quality thus being achievable in particular for laser beam welding of critical materials.

DE 38 33 110 C2 teaches an arrangement for the welding of thermoplastics by means of heat radiation, in which a first and a second thermoplastic workpiece are disposed one on top of the other on a receptacle that supports the thermoplastic workpieces in the vicinity of a weld.

A mirror mask is provided for fixing the weld, comprising a transparent, multi-layer press-on element of stamp-type design and a reflecting screen that is turned towards the first thermoplastic workpiece. The mirror mask is disposed directly on the thermoplastic workpiece between a radiation device for the welding process and the thermoplastic workpiece. A press-on device which is movable in relation to the radiation device is provided for the welding process. A halogen lamp with an infrared ellipsoid reflector is employed as a radiation device.

EP 0 890 865 B1 discloses that a filter, which is placed between a radiation source and the workpieces to be welded, is used to select a wavelength that is adapted to the welding job.

DE 199 25 203 A1 is most relevant to the present invention; it describes a method of welding at least two plastic materials by the aid of laser light energy. In doing so, auxiliary energy is supplied to the area of joining, reversibly converting, into one or several second materials, particles of at least one first material, which are available in the joining area. These second materials, in their entirety, absorb the laser radiation more strongly than the first material so that materials that are critical per se in terms of laser energy absorption become weldable with satisfying quality.

The above prior art documents offer approaches to improved welding quality in the most varying join partners, however they do not contribute to solving the problems which the invention bases on. These problems occur in particular in plastics laser beam welding of large three-dimensional contours. Conventional rigid clamping devices that are adapted to contours are rather complicated and costly in this field of application; on the other hand, the comparatively important component tolerances will not allow a uniform clamping stress field to build up on the contours, to be welded, of the molded articles. In particular, the expected deviations of components from the desired geometry will as a rule exceed the admissible tolerances, in the case of which any weld gaps are still bridged during the welding process. This problem is rendered even more serious by the non-reproducible clamping stress fields mentioned above. Furthermore, there is still the prior art difficulty, namely that weldments of materials that possess the same optical transmission properties cannot be produced without additives in at least one of the join partners.

Fundamentally, beam guidance for plastics welding of large three-dimensional contours can be put into practice without any problems by optical fibers in combination with commercial industrial robots, as it is customary in other laser-material-treatment processes. However, the problem of clamping technique is not solved so that any efficient, industrial-scale use of this welding method cannot be implemented on a reasonable basis.

Another problem in the field of contour welding of large three-dimensional molded articles resides in the unfavourable properties of weldability of the plastics often used there. Many of these plastic materials possess an inferior melting-temperature range between melting temperature and decomposition temperature. These plastic materials often plasticize at high temperatures so that the welding process that depends on heat conductivity can be implemented only at high cycle times. Furthermore, the required close range of temperature occasions narrow process windows which are an obstacle to any unproblematic industrial use of laser welding methods for the contour welding of large three-dimensional molded articles.

So as to solve these problems, the invention suggests, by additional simultaneous irradiation of the other join partner that the laser welding beam does not substantially act on in the welding area by electromagnetic secondary radiation, to obtain a temperature increase of this second join partner.

This radiation source works in favour of heating up the second join partner, which is regularly the upper, so-called "top layer" of the welding area, thus homogenizing the temperature field in the welding area on both sides of the welding level and rendering it more symmetric. Such a homogenized temperature field will expand the process window, and the process becomes less prone to malfunctions due to difficulties that are occasioned by the irregular clamping stress field in particular with large three-dimensional contours. In this regard, based on the method according to the invention and the corresponding apparatus, the clamping technique per se does no longer constitute the limiting factor of a three-dimensional welding process.

The preferred developments help attain an especially selective temperature increase of the second join partner. Owing to the different wavelengths of the laser welding beam and the secondary radiation, the thermally effective secondary radiation can be fitted in wavelength to the respective layer to be heated or melted and the radiation absorption conditions there prevailing.

Although the secondary radiation may basically also be produced by a second laser, cost reasons speak against this in the field of industrial application. Rather, infrared or UV radiators are preferred, their radiation being better absorbed by many uncoloured plastics than are customary laser welding wavelengths of for example 780 to 1000 nm. Special preference applies to short-wave secondary radiation produced by halogen infrared radiation source.

When simultaneous radiation of the two join partners is mentioned in the independent claims, this does not mean that the radiation periods must be absolutely simultaneous. Rather it must be ensured that the laser welding beam will act on the join partner, in particular the partner that is to be melted, at a time at which significant interaction with the area, of increased temperature by secondary radiation, of the join partners can take place in the sense of homogenization of the temperature field and enlargement of the process window. In this regard, according to preferred embodiments of the method according to the invention and the corresponding apparatus, the secondary radiation can be applied substantially concentrically and synchronously of the laser welding beam or leading ahead thereof.

For increased efficiency of the secondary beam source, it is advantageous to focus the secondary radiation.

In keeping with another preferred embodiment, the invention provides, to apply the secondary radiation and/or the laser welding beam by a clamping device that is transmissive thereto, in particular a clamping roller. This is accompanied with the advantage that the clamping device acts directly on the currently activated welding area, whereby component tolerances are being compensated optimally and corresponding joining gaps are reduced to a minimum.

Further features, details and advantages of the invention will become apparent from the ensuing description of exemplary embodiments, taken in conjunction with the drawings, in which FIG. 1 is a diagrammatic side view of a laser welding apparatus;

Figure 1:
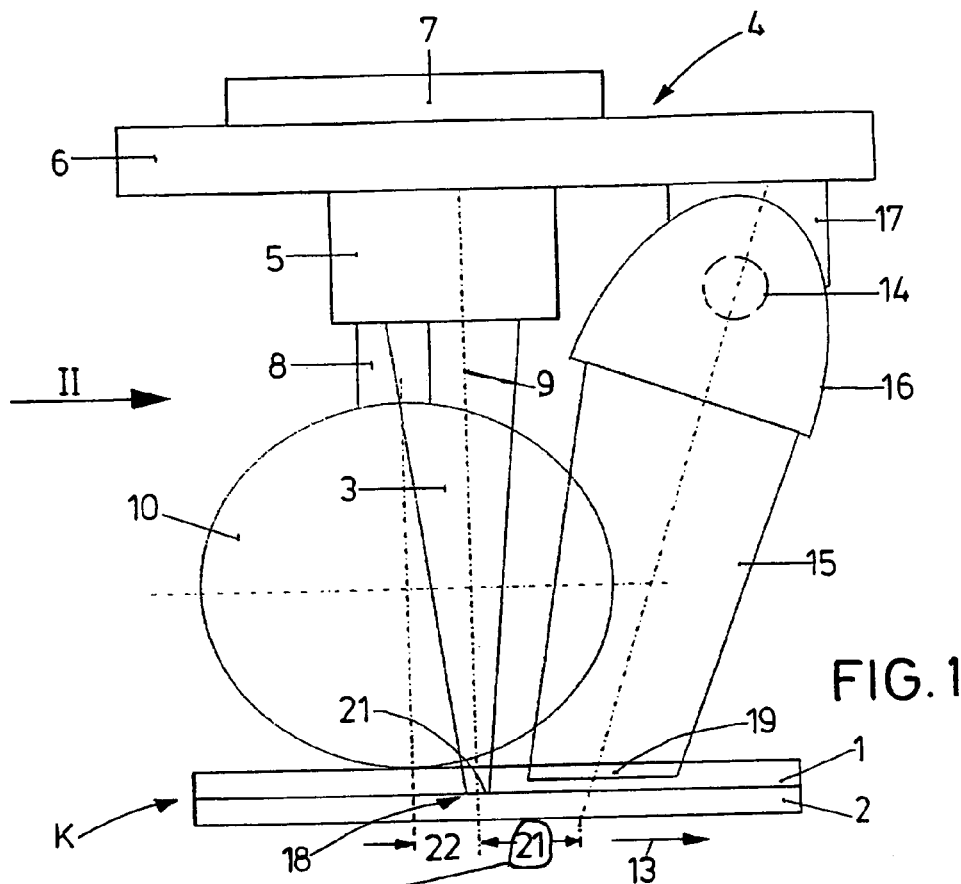
Figure 2:
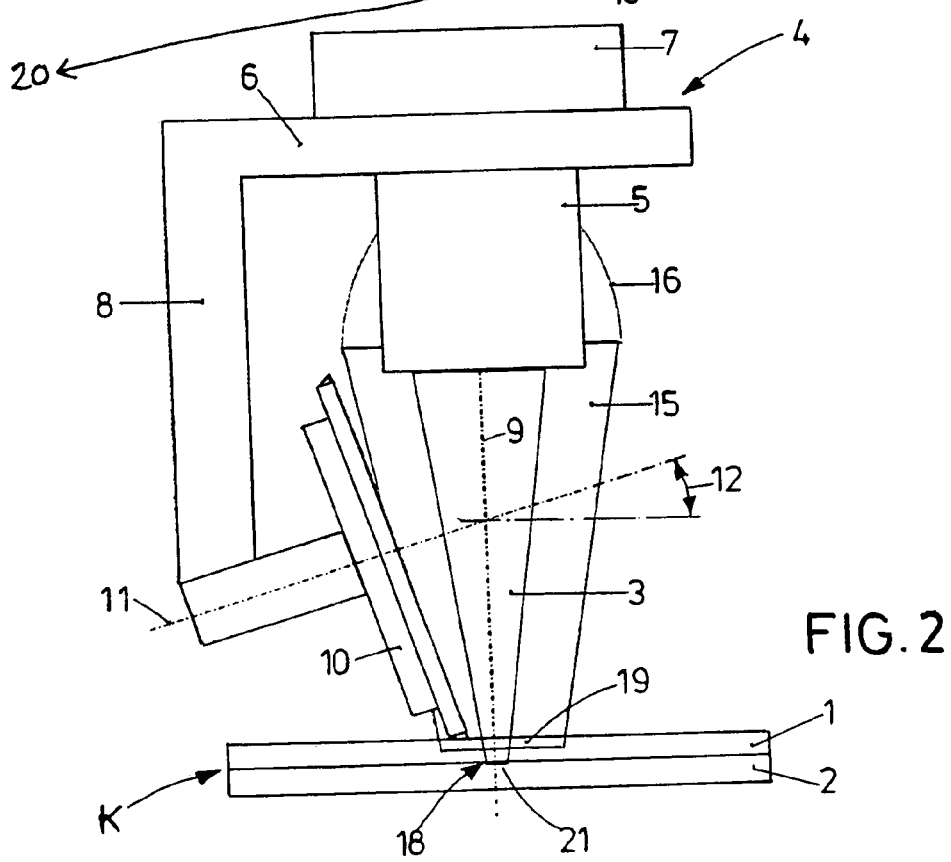
FIG. 2 is a view of the laser welding apparatus seen in the direction of the arrow II of FIG. 1.

FIGS. 1 and 2 show the outline K of two partners 1, 2 being joined by welding. To this end, use is made of a laser irradiation method with the top join partner 1 having to be as transmissive as possible to the laser welding beam 3 and the bottom join partner 2 as absorptive as possible. Laser irradiation welding is known and needs no further explanation.

By way of a treatment head that is designated by 4 in its entirety, the laser welding beam 3 is being led from a stationary laser beam source via a fiber optical system to the focusing optical system 5. For clarity the laser source and fiber optical system have been omitted in the drawings. The focusing optical system 5 is located on a support 6 of the treatment head 4 which, by way of an adapter plate 7 with a force-sensing unit, is flanged for example on the manipulation arm of an industrial robot.

By way of an extension arm 8, a clamping roller 10 is located by the side of the optical axis 9 of the laser welding beam 3; it rolls by its periphery on the top join partner 1, thus clamping the two join partners 1, 2 in the area where the weld is to be produced. For clarity, FIGS. 1 and 2 do not show a corresponding counterpart of the roller underneath the weld contour. The axis of rotation 11 of the clamping roller 10 inclines upwards at an acute angle 12 set to the horizontal so that the clamping roller 10 reaches obliquely from the side into the welding area 18, which means little interference.

A short-wave IR halogen radiator 14 is mounted on the support 6 of the treatment head 4 in the feed direction 13 thereof, producing a short-wave infrared secondary radiation 15. The IR halogen radiator 14 is located in a secondary radiation reflector 16 in the form of an ellipsoid reflector which is mounted on the support 6 by way of a corresponding holder 17. Owing to the reflector 16, the secondary radiation 15 is being focused on the welding area 18. As seen in FIG. 1, the focus 19 of the secondary radiation 15 is displaced by the misalignment 20 from the focus 21 of the laser welding beam 3. The clamping roller 10 is displaced from the laser welding beam focus 21 in the other direction by the distance 22.

Figure 3:
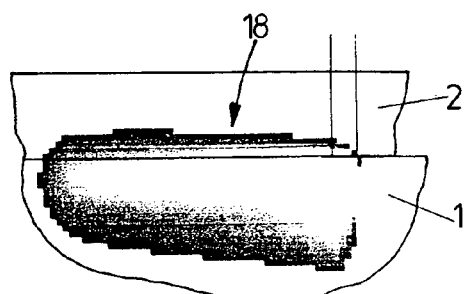
FIGS. 3 and 4 are simulated temperature field graphs for comparison of a conventional welding process to a welding process according to the invention.
Figure 4:
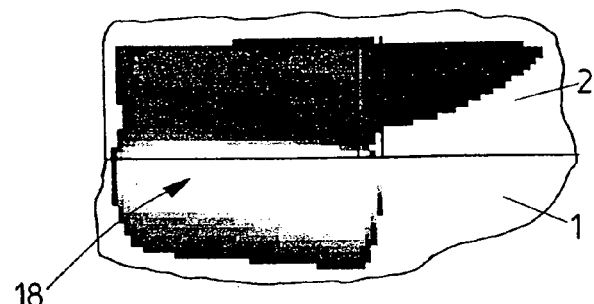

By means of the above described welding equipment the method according to the invention can be put into practice as follows:

The treatment head 4, together with the clamping roller 10, moves along the outline K in the feed direction 13, acting on the two join partners 1,2, the top outline K in the feed direction 13, acting on the two join partner 1 of which being locally heated by the leading secondary radiation in the respective welding area 18. Consequently, for initially melting the top partner 1, less heat energy is needed by the (bottom) absorbing join partner 2 in order to obtain an integral union of the two partners 1, 2 by the lagging laser welding beam 3. FIGS. 3 and 4 explain the above effect of the secondary radiation 15. FIG. 3 shows the simulated temperature field of a conventional laser welding process of polyethylene (PE) without secondary radiation. The molten phase, shown as a white area in FIG. 3, extends primarily in the bottom, absorptive join partner 1, its extension in the top, transmissive join partner 2 being inferior. This means that the process window is very narrow, any integral union by the welding process window being no longer ensured when the conditions of heat transfer from the bottom join partner 1 to the top join partner 2 deteriorate only slightly. A reason therefor may for instance reside in increased welding gaps.

As opposed to that, FIG. 4 shows a simulated temperature field in a welding process where secondary radiation 15 is involved. A focus diameter of the secondary radiation of 10 mm concentrically of the welding focus has been assumed. As for the top layer, an absorption of the secondary radiation 15 of approximately 30% per millimeter of thickness of the top join partner 1 has been set. The extension of the white field of temperature that represents the molten phase clearly shows that the depth of melting in the top join partner 1 distinctly exceeds the conditions of FIG. 3. Also the length of the inter-layer plasticizing zone is greater in the direction of welding. On the whole, the process conditions and thus the achievable process safety have clearly improved by the aid of the secondary radiation.

Figure 5:
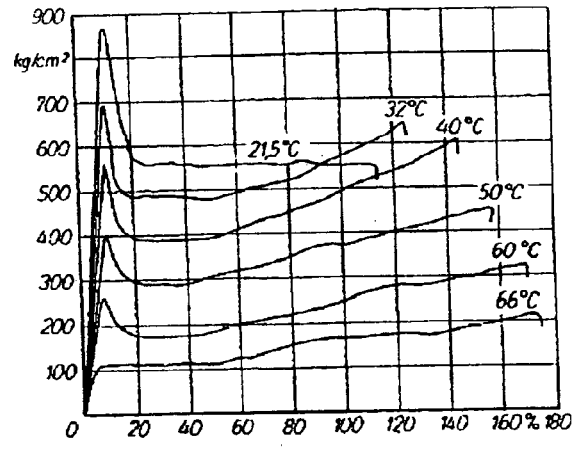
FIG. 5 is a stress-elongation diagram of a polymer.

Another advantage of the temperature increase of the top join partner resides in reduced material rigidity of the top partner. This becomes clear from the diagram of FIG. 5, in which the abscissa reflects the relative elongation of an ABS sample structure and the ordinate reflects the necessary yield strain at varying temperatures between 21.5° and 66° C. This reveals that as the temperatures rises, the yield point (peak of the curves of the diagram) and modulus of elasticity (initial ascent of the curves) shift towards lower strain values. Since the yield point of a material decisively affects the flexural strength thereof, given uniform heat penetration of the top layer even far below the melting temperature of the material, a significant drop of the flexural strength to fractions of the initial value at normal temperature can be assumed.

Figure 6:
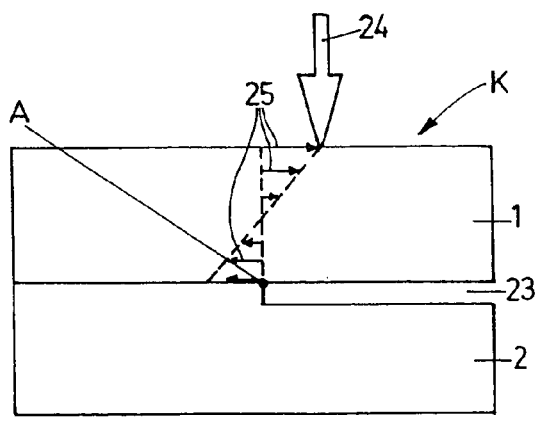
FIGS. 6 and 7 are diagrammatic cross-sectional views of the welding contour of two join partners.
Figure 7:
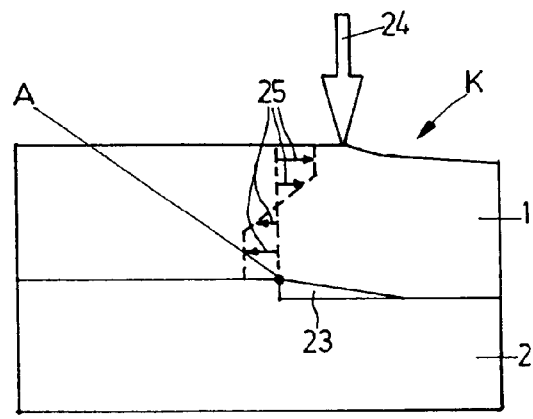

This means improved weldability regarding component tolerances, as clarification in FIGS. 6 and 7. These illustrations are sectional views of the two join partners 1, 2 crosswise of the weld direction with a gap 23, due to flaws or tolerance, on the outline K being welded. Upon application of a certain clamping pressure (arrows 24 of FIGS. 6 and 7), this can be regarded as flexion, about the point of support A, of the top partner 1 that constitutes the top layer. In a simplified view as a one-dimensional flexural arm, a linear stress field produces (arrows 25 in FIGS. 6 and 7), which is zero on the level of the neutral fiber and, in dependence on the modulus of elasticity of the material, ascends linearly towards the rims of the top layer, namely upwards as tensile stress and downwards as compressive stress. As the case may be, the gap 23 will not be bridged (sufficiently).

With the top join partner 1 heated, the yield point is decreased and the plastic material starts plasticizing earlier. At places of higher stress, a plastic condition of stress will prevail instead of a linearly elastic one. The maximally transmissible stress is now limited by the yield point and a tensile/compressive stress field produces according to FIG. 7. As illustrated, the heated join partner 1 can fit more snugly to the flaw shown, its overall bending strength being smaller than in a cold condition. The ability of gap bridging is clearly improved by the reduction, due to secondary radiation, of the bending strength of the top join partner.

Under aspects of implementation of the method of the invention, it can be said that the disclosed method and the corresponding apparatus offer lots of possibilities of process control and thus of optimizing the welding process. For instance, the misalignment of the focus 19 of the secondary radiation 15 from the focus 21 of the laser welding beam 3 can be of static nature, but may also be adapted to the prevailing conditions in the course of the process by a suitable control loop.

Other process parameters such as the feed rate, the position of the clamping roller 10 and the secondary radiation source 14, the design of the entire beam feed kinematics etc. can be adapted to the current process status. Various process parameters suggest themselves as reference variables such as the current clamping load, the measured reflection signal of the welding laser in the welding area 18 etc.

Appropriate optical elements such as filters can be used to suit the wavelength spectrum of the secondary radiation 15 to the respective materials in particular of the top join partner 1. For example, interfering regions of the spectrum can be eliminated by filters.

Figure 9:
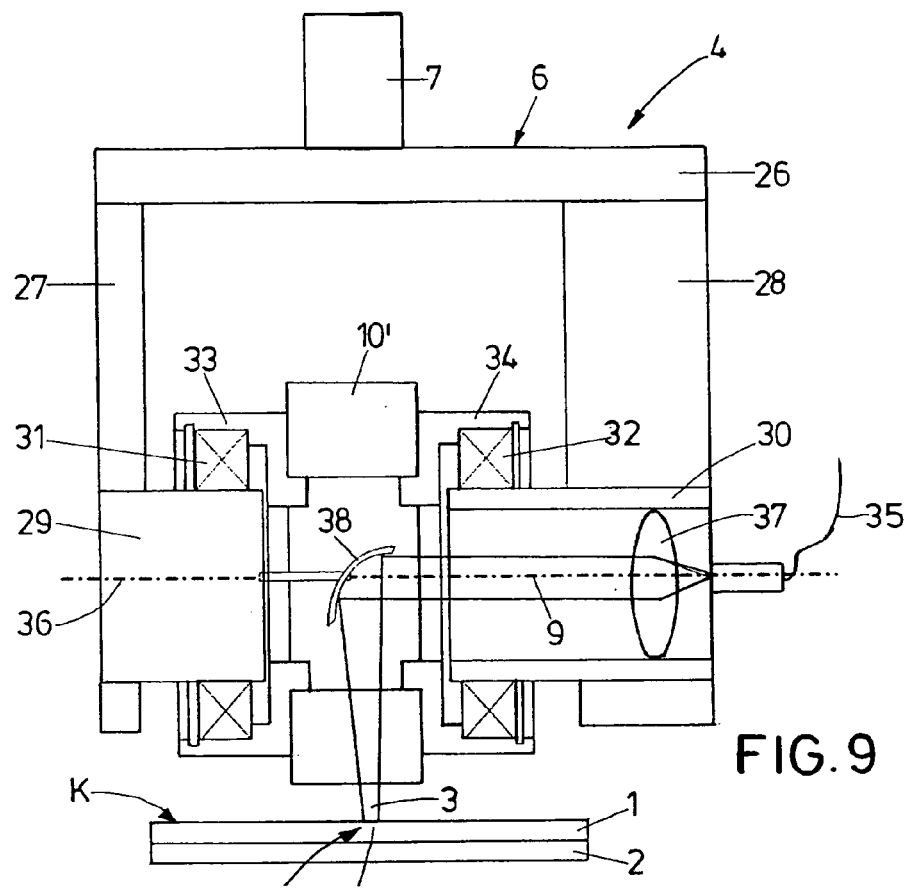
FIG. 9 is a view of this laser welding apparatus seen in the direction of the arrow IX of FIG. 8.
Figure 8:
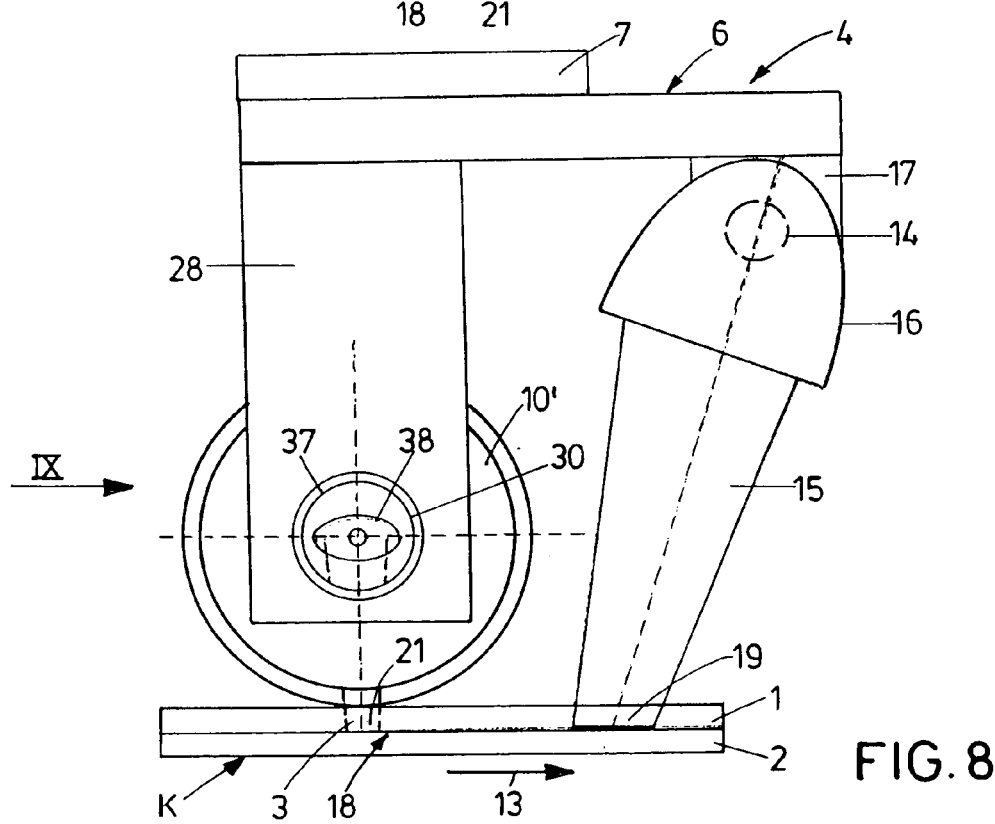
FIG. 8 is a diagrammatic side view of a second embodiment of a laser welding apparatus.

Finally, FIGS. 8 and 9 show a second embodiment of a laser welding apparatus aided by secondary radiation. A special characteristic resides in the use of a clamping roller 10' that is transmissive to the wavelength of the laser welding beam 3. In this way, the laser welding beam 3 can be led through the clamping roller 10' into the welding area. An advantage resides in that the position of clamping of the two join partners 1, 2 is identical with the focus 21 of the laser welding beam 3 so that during the melting operation of the partner 2, there will be optimal clamping of the two join partners 1,2 with slightest possible gaps.

As seen in FIGS. 8 and 9, the support 6 of the treatment head 4 is designed as a yoke 26 with two lateral cheeks 27, 28, between which and at the bottom end of which tubular throats 29, 30 are placed that are directed inwards. By way of ball bearings 31, 32, they are provided with sleeves 33, 34 which hold the transmissive clamping roller 10' jointly between them. The laser welding beam 3 passes from a laser beam source (not shown) via an optical waveguide 35 through the throat 29 and is being led coaxially of the axis of rotation 36 of the clamping roller 10' via a collimating lens 37 towards the clamping roller 10'. A focusing mirror 38 is disposed on the center line of the clamping roller 10' on the axis of rotation 36; it focuses the laser welding beam 3, which is still a raw beam, through the strand of the clamping roller 10' and into the welding area 18.

In this embodiment of a laser welding apparatus, the secondary radiation 15 is produced by analogy to the embodiment according to FIGS. 1 and 2. In this regard, reference can be made to the description there mentioned, with the same components having identical reference numerals.

In conclusion, the method according to the invention and the corresponding laser welding apparatus aided by secondary radiation help accomplish various advantages and effects which will once again be explained in short:

The process rate and stability can be increased as compared to conventional laser welding processes.

It becomes possible to join and weld material combinations which cannot or only hardly be welded by laser because of unfavourable thermal, rheological, optical and/or chemical properties.

The fault tolerance of the process rises in particular in as much as geometric deviation of the join partners from a desired geometry is involved.

Process-reliable treatment of components of three-dimensional outline can be effected at a reasonable investment cost for the clamping technique.

With none of the join partners having sufficiently high absorption, the plastics that are to be welded are preheated such that the slight absorption of heat from the laser welding beam in its focus will be sufficient for initially melting the material in the welding area.

The invention claimed is:

1. A method of contour-welding three-dimensional thermoplastic molded articles, comprising:
    moving a laser-absorptive join partner and a laser transmissive join partner into contact with one another in the vicinity of a three-dimensional outline that is to be co-welded;
    heating the join partners in a process consisting of
        exposing the laser-absorptive join partner to radiation in a welding area by a laser welding beam and transmitting the laser welding beam through the laser transmissive join partner to weld together the join partners; and
        additionally and simultaneously exposing the laser transmissive join partner in the welding area to an electromagnetic secondary radiation from a source different from a laser and selected from the group consisting of IR and UV radiation for selective temperature increase of the welding area such that the temperature field in the welding area is homogenized with respect to a molten phase and an inter-layer plasticizing zone of the join partners, wherein the secondary radiation comprises at least beam fractions that deviate from the wavelength of the laser welding beam.

2. A method according to claim 1, wherein the secondary radiation used is IR radiation which is one of a medium-wave and short-wave IR secondary radiation.

3. A method according to claim 1, wherein the secondary radiation is initiated ahead of or continued behind the laser welding beam.

4. A method according to claim 1, wherein the secondary radiation is focused.

5. A method according to claim 1, wherein at least one of the secondary radiation and the laser welding beam is applied by a clamping device that is transmissive to the secondary radiation or to the laser welding beam.

6. A method of contour welding three-dimensional thermoplastic molded articles, comprising:
   a. moving a laser-absorptive join partner and a laser-transmissive join partner into contact in the vicinity of an outline that is to be co-welded along a welding level;
   b. heating the join partners by a method consisting of
   c. exposing the laser-absorptive join partner to radiation in a welding area by a laser welding beam and transmitting the laser welding beam through the laser transmissive join partner; while
   d. simultaneously exposing the laser transmissive join partner in the welding area to secondary electromagnetic radiation from a source different from a laser and selected from the group consisting of IR and UV radiation whereby the temperature field in the welding area is homogenized with respect to a molten phase and an inter-layer plasticizing zone of the join partners, on both sides of the welding level, wherein the secondary radiation comprises at least beam fractions that deviate from the wavelength of the laser welding beam.

7. The method according to claim 6 wherein the secondary radiation is applied substantially concentrically and synchronously of the laser welding beam.

\* \* \* \* \*